April 15, 1941.　　　R. H. LAUNDER　　　2,238,120
SPRAYING DEVICE
Filed Aug. 26, 1939　　　4 Sheets-Sheet 3

INVENTOR.
BY Raymond H. Launder,
Hood & Hahn
ATTORNEYS

Patented Apr. 15, 1941

2,238,120

UNITED STATES PATENT OFFICE 2,238,120

SPRAYING DEVICE

Raymond H. Launder, Wabash, Ind.

Application August 26, 1939, Serial No. 292,001

6 Claims. (Cl. 261—30)

The object of my invention is to provide an efficient apparatus, by means of which a liquid insecticide may be economically and effectively applied to vegetation, more particularly fruit trees.

Figure 1:
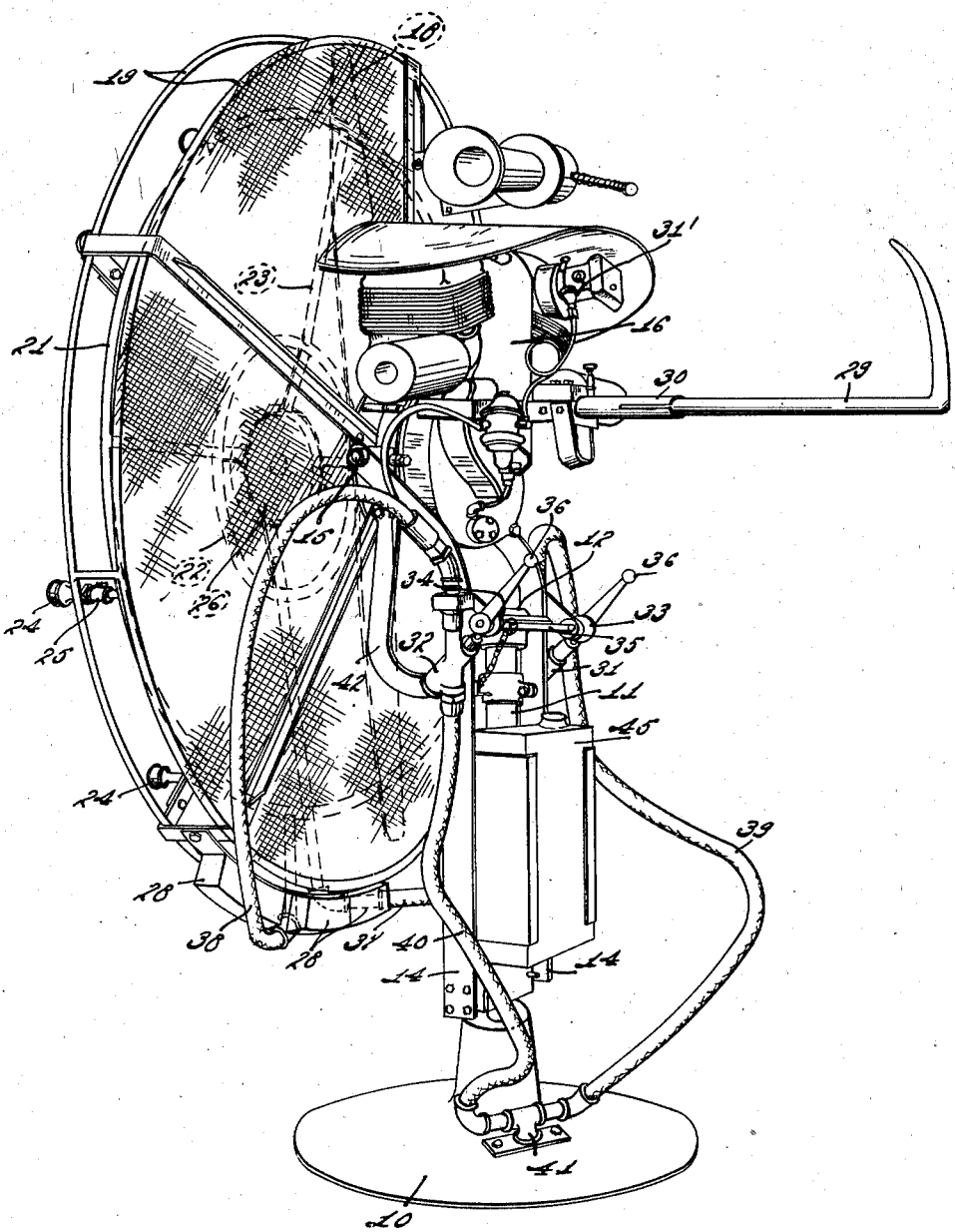
Figure 2:
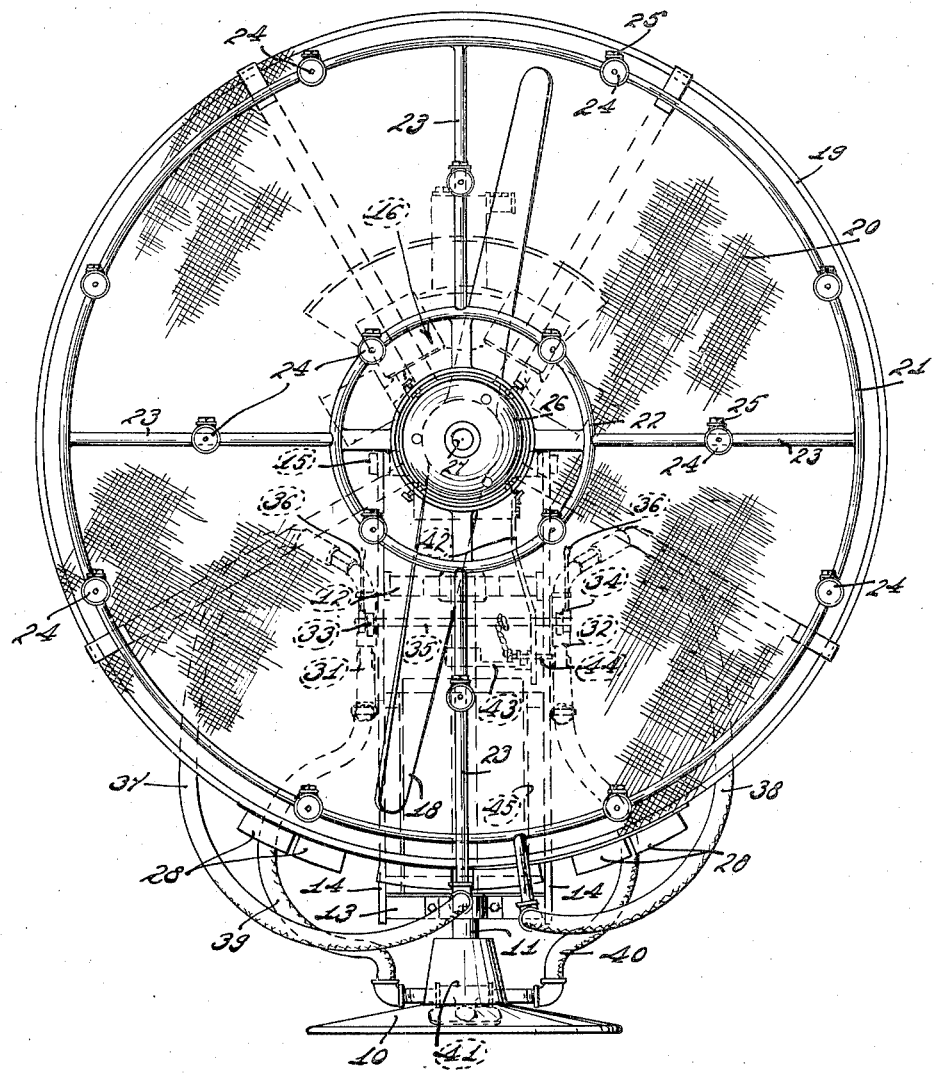
Figure 3:
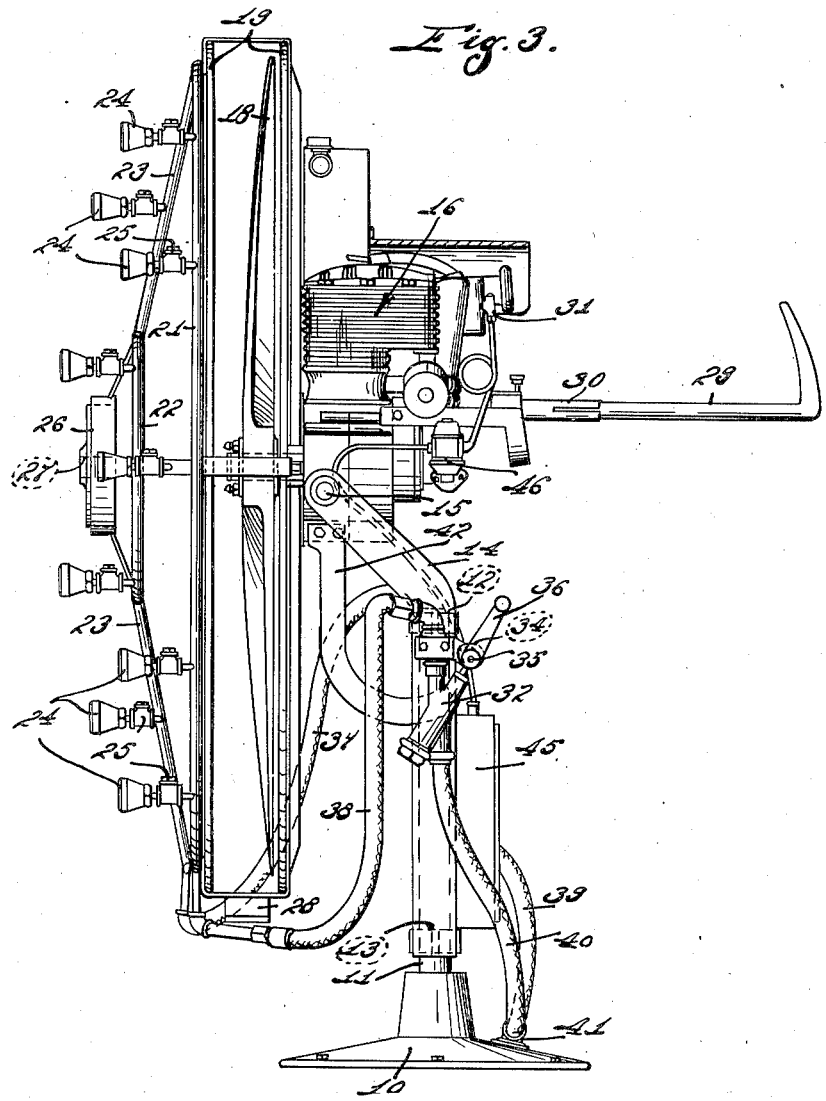
Figure 4:
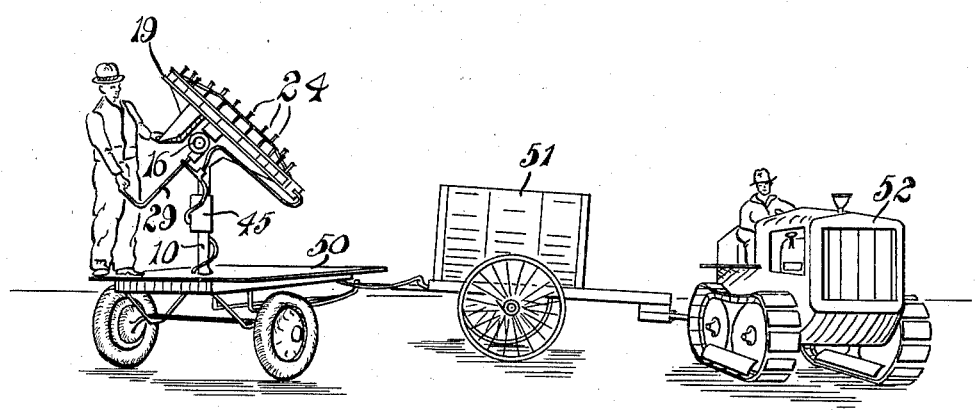
Figure 5:
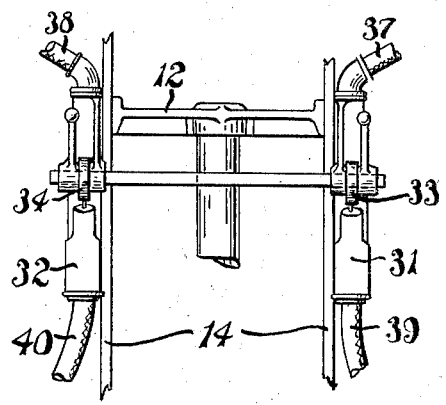

The accompanying drawings illustrate an embodiment of my invention:

Fig. 1 is a perspective view of the apparatus from the rear, or operator's side;

Fig. 2 a front elevation;

Fig. 3 a side elevation;

Fig. 4 a perspective of my improved apparatus on a trailer in conjunction with a portable tank for the supply of insecticide and a pump for delivering the insecticide under nebulizing pressure to the delivery nozzles of my apparatus; and Fig. 5 a detail of the valve controlling means.

In the drawings 10 indicates a base having a vertical standard 11 upon which are journaled the upper and lower cross bars 12 and 13 to which are vertically secured side bars 14, 14 provided, at their upper ends, with horizontal trunnion bearings to receive the trunnions 15 of the motor 16, upon the main shaft of which is mounted an air fan 18.

Secured to motor 16 is a circular fan guard 19 consisting, in part, of the screen 20. Secured to guard 19 in front of the fan 18 are two circular manifolds 21 and 22, the smaller manifold 22 having radiating extensions 23. The manifolds 21, and 22—23 are provided with a plurality of spray nozzles 24 directed in lines parallel to the axis of the fan and of a well known type capable of discharging a mist of very finely atomized insecticide delivered thereto under pressure.

Between each nozzle and its manifold is an outwardly opening check valve 25 which serves to prevent drippage from the nozzles, especially the lower ones, when the supply pressure is discontinued.

Carried by the smaller manifold 22 is a circular counterweight 26, the central perforation 27 of which is aligned with the motor shaft to serve as a bearing for the starting crank.

Other counterweights 28 are mounted upon the lower part of the guard 19 so that the weights on the front and rear of trunnions 15 are substantially equal, so that the structure carried by the trunnions 15 is practically balanced thereon.

Projecting rearwardly from motor 16 is a handle 29 upon which is mounted a carburetor control 30 connected to the carburetor 31' of the motor, the arrangement being such that the operator, grasping lever 29 in one hand and the carburetor control in the other hand, may control the speed of the motor and swing the nebulizing unit about the horizontal axis 15 and the vertical axis 11.

The yoke or frame formed by the parts 12, 13 and 14 carries two control valves 31 and 32 of the spring-closed type which are opened by cams 33 and 34 respectively, carried by shaft 35 journaled on the frame and provided, at each end, with a manipulating lever 36. Cams 33 and 34 are so formed that when either one of the levers 36 is moved in one direction, valve 31 will be opened and when moved in the other direction both the valves 31 and 32 will be opened.

Valve 31 is connected by a flexible hose connection 37 with the manifold 22—23 and valve 32 is connected by a similar hose connection 38 with the manifold 21.

The valves 31 and 32 are connected by flexible hose connections 39 and 40 with the supply fitting 41 mounted on base 10 and adapted to receive a supply of insecticide from any suitable source.

Motor 16 carries a segment 42 which swings alongside of one of the side bars 14 between that bar and an arm 43 (Fig. 2) carried by standard 11, the arrangement being such that a pin 44 may be projected through the arm 43, segment 42, and the adjacent side bar 14 to lock the parts against swinging movement around trunnions 15 and stem 11.

Fuel for the motor is carried in tank 45 and delivered therefrom to the motor by pump 46.

The apparatus above-described is conveniently transportable through an orchard upon a trailer 50 upon which the manipulating operator may stand, and liquid insecticide is supplied thereto under pressure from a tank car 51 which may be conveniently trailed behind an automobile 52.

Liquid insecticide delivered to the manifolds under sufficient pressure, will issue from the nozzles in the form of a very fine, floating mist which will ride the large volume, low pressure blast from fan 18 and the operator, by manipulating lever 29 and throttle control 30, may direct the movements of the mist both as to direction and speed into contact with the foliage, especially the under surfaces thereof, and by controlling the volume of the mist, through manipulation of valves 31 and 32 may cause an effective deposit of the insecticide which will be adequate without excess.

I claim as my invention:

1. A distributor for liquid insecticide comprising, a portable supporting standard, a carrier supported by said standard to be swingable about a substantially vertical axis fixed relative to the standard, a second carrier mounted on the first carrier and swingable about a substantially horizontal axis offset from the axis of the first carrier, a shaft journalled in the second carrier on an axis at right angles to the axis of the second carrier, a fan carried by said shaft and formed to develop an air blast generally in line with the shaft, a plurality of spray nozzles in front of the fan directed in the general line of the fan blast and carried by the second carrier and movable as a unit only with said second carrier, a conduit through which a liquid may be delivered under pressure to said spray nozzles, means by which the second carrier may be swung about either or both of the carrier axes, and means by which the fan shaft may be rotated without causing movement of the nozzle group, the axis of said second carrier being disposed between said fan and the axis of said first carrier, whereby the vertical range of movement of said second carrier is increased.

2. Apparatus of the character specified in claim 1 wherein the axis of the second carrier is substantially horizontal, and including means carried by the fan and nozzle group and substantially counterbalancing the same about the axis of the second carrier.

3. Apparatus of the character specified in claim 1 wherein the means for causing fan-shaft rotation is a motor carried by the second carrier.

4. Apparatus of the character specified in claim 1 wherein a check valve is arranged in the conduit between the conduit inlet and the nozzles.

5. Apparatus of the character specified in claim 1 wherein certain of said spray nozzles are arranged in two annular series, one of said series being positioned closely adjacent the outer periphery of the fan, and the other of said series being positioned closely adjacent the axis of said fan, and valve means controlling the flow of insecticide to said other series independently of flow of insecticide to said one series.

6. A distributor for liquid insecticide, comprising a portable supporting standard, a carrier supported by said standard and swingable about a substantially vertical axis fixed relative to said standard, a second carrier mounted on the first carrier and swingable about a substantially horizontal axis, a shaft journalled in the second carrier on an axis at right angles to the axis of the second carrier, a fan carried by said shaft and formed to develop an air blast generally in line with the shaft, a plurality of spray nozzles in front of the fan directed in the general line of the fan blast and carried by the second carrier and movable as a unit only with said second carrier, a conduit through which a liquid may be delivered under pressure to said spray nozzles, means by which the second carrier may be swung about either or both of the carrier axes, and means by which the fan shaft may be rotated without causing movement of the nozzle group, certain of said spray nozzles being arranged in an annular series closely adjacent the outer periphery of said fan, and others of said spray nozzles being arranged in an annular series closely adjacent the axis of said fan, and valve means controlling flow of insecticide to said last-mentioned series of nozzles independently of flow of insecticide to said first-mentioned series of nozzles.

RAYMOND H. LAUNDER.